UNITED STATES PATENT OFFICE.

PAUL JULIUS AND FRITZ GÜNTHER, OF LUDWIGSHAFEN, GERMANY, ASSIGNORS TO BADISCHE ANILIN AND SODA FABRIK, OF LUDWIGSHAFEN, GERMANY, A CORPORATION OF BADEN.

DISAZO WOOL-DYE AND PROCESS OF MAKING SAME.

SPECIFICATION forming part of Letters Patent No. 692,676, dated February 4, 1902.

Application filed December 7, 1901. Serial No. 85,094. (No specimens.)

*To all whom it may concern:*

Be it known that we, PAUL JULIUS, a subject of the Emperor of Austria-Hungary, and FRITZ GÜNTHER, a subject of the King of Prussia, German Emperor, doctors of philosophy and chemists, and both residents of Ludwigshafen-on-the-Rhine, in the Kingdom of Bavaria, Germany, have invented new and useful Improvements in the Manufacture of Disazo Coloring-Matter and Processes of Producing the Same, of which the following is a specification.

This invention relates to the production of a new disazo dye which dyes wool in shades which are within the range of violet to brownish violet and which dyeings on subsequent treatment with bichromate of potash are changed to a blue-black shade, which latter withstands the action of external influences—such as light, washing, fulling, steaming, boiling water, carbonization, &c.—in a most exceptional manner. This dye can be made from the tetrazo compound of a hitherto unknown diamido-para-hydroxy-benzyl-sulfonic acid by suitably combining one molecular proportion of the same with two molecular proportions of beta-naphthol.

In the following we describe a process by means of which our invention may be practically carried out, without, however, limiting ourselves to this exact description, since there are other means by which our invention may be carried into effect. The parts are by weight.

(A) *Production of the tetrazo compound.*—Before arriving at our new diamido-para-hydroxy-benzyl-sulfonic acid we produce a new dinitro-para-hydroxy-benzyl-sulfonic acid by nitrating the known para-hydroxy-benzyl-sulfonic acid, which latter has been described by G. Mohr in "*Annalen der Chemie,*" 1883, Vol. 221, page 221. We may proceed as follows: Dissolve fifty-two and five-tenths (52.5) parts of one-hundred-per-cent. (100%) sodium para-hydroxy-benzyl-sulfonate in three hundred and twenty-five (325) parts of sulfuric acid containing about ninety-six per cent. of sulfuric acid ($H_2SO_4$) and cool to about five degrees centigrade below zero, ($-5°$.) Into this solution introduce, drop by drop, stirring meanwhile, a mixture consisting of fifty-three and four-tenths (53.4) parts of nitric acid containing sixty-two (62) per cent. of nitric acid ($HNO_3$) and sixty (60) parts of sulfuric acid containing about ninety-six (96) per cent. of sulfuric acid, ($H_2SO_4$.) Keep the temperature below zero centigrade during the reaction and toward its close let the temperature rise to between fifteen (15°) and sixteen (16°) degrees centigrade. When a test portion of this mixture, tested by the Lunge nitrometer, shows that the nitration is completed, pour this mixture upon about five hundred (500) parts of ice, dilute with about five thousand (5,000) parts of water, and add about three thousand (3,000) parts of milk of lime prepared from two hundred and thirty (230) parts of good quicklime (CaO) and the necessary quantity of water. Stir thoroughly for about fifty minutes and filter off the undissolved material. Suitably concentrate the so-obtained filtrate by evaporation until crystallization sets in. To the so-concentrated filtrate add dilute sulfuric acid containing about twenty (20) per cent. of sulfuric acid ($H_2SO_4$) until the liquid shows an acid reaction toward Congo paper. Now filter off the precipitate which has been formed. Run this filtrate, stirring the meanwhile, into a mixture of five hundred (500) parts of water, one hundred and fifty (150) parts of iron filings, and twenty (20) parts of acetic acid containing thirty (30) per cent. of acetic acid, ($HC_2H_3O_2$,) which mixture is heated on a boiling-water bath until a test portion, when rendered alkaline with carbonate of soda and filtered, upon gently heating no longer turns yellow. The reaction is generally finished in a short time. Add carbonate of soda to this mixture until a mixture is produced having an alkaline reaction toward litmus-paper and then filter off the precipitate contained therein. The so-obtained filtrate contains our new diamido-para-hydroxy-benzyl-sulfonic acid in the form of its sodium salt. Of this filtrate take an amount corresponding to ten and nine-tenths (10.9) parts of free diamido-para-hydroxy-benzyl-sulfonic acid (one molecular proportion) and add to it thirty-two and six-tenths (32.6) parts of hydrochloric acid containing twenty-eight (28) per cent. of hydrochloric acid (HCl) (five (5) molecular proportions) and six and nine-tenths (6.9) parts of nitrite of soda containing one hundred (100) per cent. of nitrite of soda, ($NaNO_3$,) (two (2) molecular proportions.) The nitrite of soda is to be added slowly in the form of a solution containing about twenty (20) per cent. thereof, and during its addition the temperature of the reaction mixture is to be kept at ten (10°) degrees centigrade. When iodide of potash and starch test-paper shows that nitrous acid is no longer present, the reaction is complete, and the liquid contains the new tetrazo compound of our new diamido-para-hydroxy-benzyl-sulfonic acid.

(B) *Production of the dyestuff.*—The tetrazo compound obtained as described in the preceding Example A is slowly run into a solution made from about sixteen (16) parts of beta-naphthol, (about two (2) molecular proportions,) forty-five (45) parts of calcined carbonate of soda, (about eight and four-tenths (8.4) molecular proportions,) and fourteen (14) parts of a caustic-soda lye containing thirty-five (35) per cent. of caustic soda, (NaOH,) (about two (2) molecular proportions,) at ordinary temperature. After the whole of both liquids have been mixed gradually raise the temperature of the resulting mixture to forty (40°) to fifty (50°) degrees centigrade and maintain this temperature for a period of about from four (4) to five (5) hours, at the end of which the formation of our new dyestuff is practically complete. Our new dyestuff is present in this mixture as undissolved suspended material and may be collected by filtering off and washing with cold water. If desired, our so-obtained new dyestuff may be purified by dissolving it in boiling water and precipitating it from this solution by means of carbonate of soda.

Our new dyestuff possesses the following properties: In water containing but very small amounts of ammonia or of carbonate of soda it is difficultly soluble in the cold, but somewhat more easily soluble on boiling, giving an aqueous solution of greenish-blue color. Sodium carbonate in excess of the amount just stated produces a blue-black flocculent precipitate when added to the aqueous solution of our new dyestuff.

Our new dyestuff dissolves in concentrated sulfuric acid containing about ninety-six (96) per cent. of sulfuric acid, ($H_2SO_4$,) giving a solution possessing a blue-violet color, which solution on dilution with water yields a dirty wine-red precipitate. It dyes wool in exceptionally-level shades which are within the range of violet to brownish-violet and which on subsequent suitable treatment with bichromate of potash become blue-black, which shade is exceedingly fast to light, water, washing, steaming, boiling water, carbonization, and the like.

Now what we claim is—

1. The process of making a disazo dyestuff which consists in combining the tetrazo compound of diamido-para-hydroxy-benzyl-sulfonic acid with beta-naphthol.

2. As a new product the disazo dyestuff which can be obtained from one molecular proportion of the tetrazo compound of diamido-para-hydroxy-benzyl-sulfonic acid and two molecular proportions of beta-naphthol, which dyes wool in shades which are within the range of violet to brownish-violet, which shades on treatment with bichromate of potash become blue-black, and which dyestuff on treatment with concentrated sulfuric acid gives a blue-violet color which becomes wine-red on dilution with water.

In testimony whereof we have hereunto set our hands in the presence of two subscribing witnesses.

PAUL JULIUS.
FRITZ GÜNTHER.

Witnesses:
BERNHARD C. HESSE,
JACOB ADRIAN.